Patented Nov. 18, 1941

2,263,290

UNITED STATES PATENT OFFICE 2,263,290

NITROUREA-PHENOL-ALDEHYDE CONDENSATION PRODUCTS

Gaetano F. D'Alelio, Pittsfield, Mass., assignor to General Electric Company, a corporation of New York No Drawing. Application September 27, 1939, Serial No. 296,811

13 Claims. (Cl. 260—45)

This invention relates to the production and utilization of new condensation products and is concerned more particularly with valuable and useful resinous condensation products adapted for use in molding, casting, laminating, coating and adhesive applications, and for other purposes. Specifically, the invention relates to products obtained by reacting ingredients comprising an aldehyde, for example formaldehyde, a phenol and a nitrated urea having at least one hydrogen atom attached to a nitrogen atom in the urea grouping, more particularly nitrourea. Such nitrated ureas, which are organic nitro compounds containing the structure

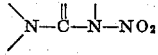

are reactable with aliphatic or aromatic aldehydes and, for purpose of brevity, are referred to hereafter as "aldehyde-reactable nitrated ureas." These nitrated ureas are not to be confused with urea nitrates, which are salts. An example of such a salt is urea nitrate, $NH_2CONH_2 \cdot NHO_3$.

Salts of aldehyde-reactable nitrated ureas, alone or mixed with aldehyde-reactable nitrated ureas, also may be used in carrying the present invention into effect. Such salts may be formed by treating an aldehyde-reactable nitrated urea with a basic substance. The basic substance may be of an organic or inorganic nature. Examples of basic substances which may be used in making salts of nitrated ureas are ammonia, methyl amine, trimethyl amine, ethylene diamine, ethanol amines such as mono-, di- and tri-ethanol amines, hydroxides of the alkali and alkaline-earth metals, for instance potassium hydroxide, calcium hydroxide, etc. A more specific example of a salt of an aldehyde-reactable nitrated urea is the sodium salt of nitrourea, which may be produced by treating nitrourea with a solution of sodium hydroxide, thus:

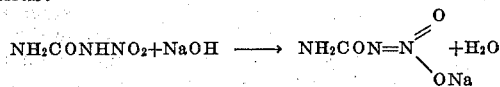

The term "nitrated urea" ("N-nitrated urea") as used generally hereafter is intended to include within its meaning nitrated ureas, salts of nitrated ureas and mixtures thereof.

In producing the new condensation products the choice of the aldehydic component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, benzaldehyde, etc., mixtures thereof, or mixtures of formaldehyde (or compounds engendering formaldehyde) with such aliphatic or aromatic aldehydes. In general the longer the chain of the aliphatic aldehyde, the slower the cure of the resinous condensation product and the softer is the final product.

In the production of phenol-aldehyde condensation products it is common practice to effect the reaction between the components in the presence of an alkaline catalyst such as sodium hydroxide. For some applications of the finished product it is desirable to have the amount of free alkaline bodies in the product at a minimum. I have discovered that by intercondensing a nitrated urea, specifically nitrourea, with a phenol and an aldehyde in the presence of a substance having basic properties, the alkaline condition of the resinous condensation product can be substantially reduced, thereby increasing its utility. The reaction probably proceeds thus: The alkaline body first combines with the nitrated urea to form a salt or complex thereof which, in turn, undergoes condensation with the aldehydic component and thus becomes an integral part of the mass. For optimum results the amount of nitrated urea should be at least chemically equivalent to the amount of base used. Ordinarily, a molecular excess of nitrated urea over base is employed, in which case there is formed a condensation product (more specifically, a co-condensation product) of a phenol, an aldehyde, a nitrated urea and a salt of a nitrated urea.

Heretofore phenol-aldehyde condensation products have been made into opaque castings by carefully controlling formulations and operating technique so that water would be colloidally dispersed throughout the cured resinous mass. The process was extremely critical and has not been entirely satisfactory. I have further discovered that opaque resinous products can be obtained in an expeditious and satisfactory manner by intercondensing suitable proportions of phenol, formaldehyde and a nitrated urea or a salt thereof (or a mixture of a nitrated urea and one of its salts). These opaque intercondensation products are considerably more resistant to surface alteration or discoloration than opaque phenol-formaldehyde condensation products containing colloidally dispersed water.

In producing phenol-aldehyde-nitrated urea co-condensation products, specifically phenol-aldehyde-nitrourea co-condensation products, the phenolic component may be, for example, phenol itself, $C_6H_5OH$, or its homologues such as the ortho, meta and para cresols, the xylenols, etc.; higher alkyl phenols such as meta ethyl phenol, para tertiary butyl phenol, para tertiary amyl phenol, etc.; aryl phenols such as the ortho, meta and para phenyl phenols, the ortho, meta and para benzyl phenols, phenyl phenol ethane, para para prime dihydroxy diphenyl propane, etc.; or mixtures of such aldehyde-reactable phenolic bodies.

The new intercondensation products of this invention in which the phenolic body is a substituted phenol containing three or more carbon atoms in the substituent grouping are soluble in oils, as for example drying and semi-drying fatty oils, and in such form, with or without further heat treatment of the oily solution of the resinous condensation product, may be used in the production of coating compositions such as varnishes, enamels, lacquers, etc. Examples of substituted phenols yielding oil-soluble intercondensation products are butyl phenols, amyl phenols, indene phenols, coumar phenols, phenyl phenols, 2-ethylhexyl phenols, terpene phenols, symmetrical phenyl phenol alkanes, styryl phenols, the nuclearly alkylated styrene phenols, the nuclearly alkylated phenyl, phenol alkanes, the nuclearly phenylated phenyl, phenol alkanes, and the like. In general, the only requirement of the phenolic component in producing the new phenol-aldehyde-nitrated urea co-condensation products of this invention is that it be capable of undergoing condensation with an aldehyde. Terms such as "a phenol," "phenol component," "phenolic substance" and "phenolic body," as used generally herein and in the appended claims, are intended to include within their meaning aldehyde-reactable phenols of the kinds above mentioned by way of illustration.

In carrying the present invention into effect the condensation reaction between the components may be carried out at normal or at elevated temperatures, in the presence or absence of a condensation catalyst and under alkaline, neutral or acid conditions. Neutral conditions may be established by neutralizing (if necessary) either the mixed component or components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the condensation products of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the nitrated urea to a partial condensation product of a phenol and an aldehyde and effect further condensation between the components. Or, I may first condense the nitrated urea with an aldehyde, add the resulting product to a phenol-aldehyde partial condensation product and then cause the reaction to proceed further. Or, I may condense or partially condense the nitrated urea with a molecular excess of an aldehyde, add a phenol to this condensation product and effect further reaction between the components. Still other ways may be employed in combining the components and in producing the unmodified or modified condensation products of this invention, as will be readily understood by those skilled in the art as the description of the invention proceeds. The soluble, fusible intercondensation products of this invention also may be incorporated into separately prepared soluble, fusible condensation products, for example soluble, fusible phenolaldehyde condensation products, to yield compositions which may be co-cured under heat or under heat and pressure to the insoluble, infusible state.

In practicing this invention products of a desired cure rate may be obtained by intercondensing a phenol, an aldehyde and an adjusted ratio of a nitrated urea and a salt of a nitrated urea. A high ratio of nitrated urea to nitrated urea salt may be used without lessening the stability and the curing rate of the resin. By decreasing the ratio of nitrated urea to nitrated urea salt, products of a slower cure, and therefore more readily controlled, may be obtained. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses can be converted under heat or under heat and pressure to the insoluble, infusible state.

Depending upon the particular reactants employed and the particular conditions of reaction, these intermediate condensation products vary from clear, syrupy, water-soluble liquids to viscous dispersions and gel-like masses of decreased solubility in ordinary solvents such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface coating materials, in the production of paints, varnishes, lacquers, enamels, etc., for general adhesive applications, in producing laminated articles and for numerous other purposes. The liquid intermediate condensation products also may be used directly as casting resins. Certain of the intermediate condensation products may be dried and granulated, if desired, to form clear or opaque, unfilled, heat-convertible resins.

In order that those skilled in the art better may understand how this invention may be carried into effect, the following examples are given by way of illustration. All parts are by weight.

Example 1

|  | Parts | Mols (approximately) |
|---|---|---|
| Nitrourea | 5.4 | 0.05 |
| Aqueous formaldehyde (37.1%) | 10.1 | 0.125 | were mixed, resulting in the evolution of a considerable amount of heat accompanied by boiling. When spontaneous boiling had stopped, the mixture was heated to continue the boiling until all of the solid nitrourea had been dissolved. A fast curing resinous condensation product was obtained. The soluble, fusible condensation product may be incorporated, if desired, with a soluble, fusible phenol-formaldehyde condensation product, or with other compatible, fusible, soluble resinous composition, and the mixed partial condensation products further co-condensed.

Example 2

|  | Parts | Mols (approximately) |
|---|---|---|
| Distilled phenol | 94 | 1 |
| Aqueous formaldehyde (37.1%) | 89 | 1.1 |
| Nitrourea | 1 | 0.1 | were mixed and refluxed for 1 hour. A white phase of an intercondensation product separated from the mass. The mass was dehydrated under 27 inches vacuum to an internal temperature of 100° C. At room temperature the dehydrated mass was a solid, brittle resin. This resin was incorporated into a molding composition comprising the following components:

|  | Parts |
|---|---|
| Above-described resin | 90 |
| Wood flour | 90 |
| Lime | 7.2 |
| Calcium stearate | 63 |
| Hexamethylenetetramine | 9 |
| Nigrosin (dye) | 9 |

These ingredients were mixed until a homogeneous product was obtained and then sheeted for about 1 minute on rolls heated to approximately 110° to 120° C. The sheeted material was pulverized and the resulting powder molded under heat and pressure in accordance with practice commonly followed in molding conventional phenol-formaldehyde molding compositions. The molded articles were of good color and surface finish, showed flexural and impact strength characteristics of a high order and had excellent water and solvent resistance.

Example 3

|  | Parts | Mols (approximately) |
|---|---|---|
| Technical phenol (82%) | 6000 | 60 |
| Aqueous formaldehyde (37.2%) | 6300 | 77 |
| Sodium hydroxide in 200 parts of water | 30 | 0.75 |
| Nitrourea | 78.75 | 0.751 |

All of the components with the exception of the nitrourea were refluxed for ½ hour after which the nitrourea was added and heating continued until all the nitrourea was in solution. The resulting liquid resinous mass was dehydrated to an internal temperature of about 75° C. The hot resin was poured into molds and cured at about 70° C. for 61 hours. The flexural strength of the cured resin was above the limit of measurement of the testing device, that is, above 20,000 pounds per square inch. The impact strength of the cured resin also was above the limit of measurement of the instrument, that is, above 2.2 foot pounds per square inch. The unbroken specimen, which had been subjected to both flexural and impact strength tests, was heated for one week at 70° C. Under these conditions the ordinary phenol-formaldehyde casting resins become very brittle. However, at the end of the 1-week heat test the cured resin of this example showed a flexural strength of 18,000 pounds per square inch. A resinous composition produced from the same proportions of phenol and formaldehyde as described under this example, but in which the nitrourea had been replaced by an equivalent amount of sulfuric acid, was similarly cured for 61 hours. The flexural strength of the cured product was only 13,000 pounds per square inch and its impact strength was only 0.6 foot pound per square inch.

Example 4

|  | Parts | Mols (approximately) |
|---|---|---|
| Distilled phenol | 94 | 1 |
| Aqueous formaldehyde (37.1%) | 120 | 1.5 |
| Sodium hydroxide in 10 parts water | 0.5 | 0.0125 |
| Nitrourea in 25 parts water | 1.31 | 0.0125 |
| Glycerine | 5 | 0.054 |

The above components with the exception of the nitrourea and the alcohol, specifically glycerine, were refluxed for 60 minutes, after which the nitrourea and glycerine were added. The liquid resinous mass was dehydrated under a vacuum of 24.5 to 26.5 inches to an internal temperature of 90° C. Wood veneering was impregnated with the dehydrated resin syrup by passing the wood between rolls while applying liquid resin from each side. These sheets were cut to suitable size and 17 layers were superposed and bonded together by heating at about 130° to 140° C. for from 30 to 60 minutes under a pressure of about 100 to 150 pounds per square inch. The resulting laminated product had a high gloss, was extremely light in color and could not be delaminated without rupture of the wood fibers.

The dehydrated resin also is well adapted for the production of cast articles. Heating of the resin syrup in glass molds for 72 hours at 70° to 80° C. yielded strong cast articles of ivory color.

If desired, the glycerine may be omitted from the above formulation.

Example 5

|  | Parts | Mols (approximately) |
|---|---|---|
| Distilled phenol | 94 | 1 |
| Aqueous formaldehyde (37.1%) | 161 | 2 |
| Sodium hydroxide in 10 parts water | 1 | 0.025 |
| Nitrourea in 100 parts ethyl alcohol | 3.2 | 0.03 |

All of the components with the exception of the nitrourea were refluxed for 45 minutes, after which the alcoholic solution of nitrourea was added. The liquid resinous mass was dehydrated under a vacuum of 26 to 27 inches to an internal temperature of 70° C.

The dehydrated resin was cast in glass molds and heated for 15 hours at 100° C. The cured resin had the appearance of old ivory. The addition of 5% glycerine to the liquid resin prior to curing yielded cured articles of a chalk white color.

The dehydrated resin syrup also is well adapted for the production of laminated articles as shown by the following: Alpha cellulose sheet stock was impregnated with the resin syrup to a 60% resin content. The impregnated sheets were heated for 2 hours at 70° C., after which they were superposed and bonded together by heating at 130° C. under a pressure of 1150 pounds per square inch. The resulting laminated product was slightly yellow when viewed through transmitted light. It had good water- and solvent-resistance. If nitrourea be omitted from the above formulation, laminated products of a dark purplish-brown color are obtained.

The following is illustrative of the production of molding compositions and molded articles from the resinous condensation product of this example.

|  | Parts |
|---|---|
| Above-described resin | 75 |
| Alpha flock | 75 |
| Zinc stearate | 0.75 | were mixed and the resulting mixture dried at 80° C. for 100 minutes. The dried compound was molded for 2 minutes at 180° C. under a pressure of 2000 to 3000 pounds per square inch. The molded articles were a light chocolate brown in color. The substitution in the above formula of a resin in the production of which no nitrourea has been used, but with other components and proportions thereof the same as the resin of this example, yields molded articles of a dark reddish-purple color.

*Example 6*

|  | Parts | Mols (approximately) |
|---|---|---|
| Distilled phenol | 94 | 1 |
| Aqueous formaldehyde (37.1%) | 161 | 2 |
| Sodium hydroxide in 10 parts water | 1 | 0.025 |
| Nitrourea in 50 parts alcohol | 2.7 | 0.0257 |
| Glycerine | 5 | 0.054 |

All of the above components with the exception of the nitrourea and the glycerine were refluxed for 30 minutes, after which the glycerine and the alcoholic solution of the nitrourea were added. The resulting mass was dehydrated to an internal temperature of 90° C. at 2 mm. pressure. Castings of the dehydrated resin were similar in appearance and characteristics to the cured cast resins of Example 4.

The adhesive characteristics of the dehydrated resin are of a high order, as shown by the following: Wood blocks were faced with a layer of the resin and pressed together with clamps, using just sufficient pressure to keep the blocks together. The pressed blocks were baked for 1 hour at 100° C. After this treatment any attempt to separate the blocks resulted in splitting of the wood, there being no rupture of the resin bond. Molded phenolic articles similarly were bonded together, yielding well-bonded products.

If desired, the glycerine may be omitted from the above formulation.

*Example 7*

|  | Parts | Mols (approximately) |
|---|---|---|
| Distilled phenol | 94 | 1 |
| Aqueous formaldehyde (37.1%) | 161 | 2 |
| Sodium hydroxide in 5 parts water | 0.5 | 0.0125 |
| Nitrourea in 50 parts alcohol | 1.35 | 0.0128 |
| Glycerine | 5 | 0.054 |

All of the above components with the exception of the nitrourea and the glycerine were refluxed for 90 minutes, after which the glycerine and the alcoholic solution of the nitrourea were added. When cooled to room temperature the resulting mass showed two phases—one clear and almost water-white, the other white and clouded. The resinous mass was dehydrated under a vacuum of 27 inches to an internal temperature of 80° C. At the end of the dehydration period the resin was slightly opalescent. The dehydrated mass was poured into molds and cured for 42 hours at 80° C. The cured product was opaque and resembled old ivory in color. When specimens of the cured resin were placed in boiling water for 4 minutes they had sufficient ductility at that temperature that they could be bent into a variety of shapes. They permanently retained this new shape if they were allowed to cool under the applied stress. If a less ductile product is desired, the glycerine may be omitted from the above formula.

*Example 8*

|  | Parts | Mols (approximately) |
|---|---|---|
| Distilled phenol | 188 | 2 |
| Aqueous formaldehyde (37.1%) | 322 | 4 |
| Sodium hydroxide in 20 parts water | 2 | 0.05 |
| Nitrourea in 75 parts alcohol | 5.4 | 0.0514 |
| Glycerine | 15 | 0.162 |

The above components with the exception of the nitrourea and the glycerine were refluxed for ½ hour after which the glycerine and the alcoholic solution of the nitrated urea were added. The resinous mass was dehydrated under a vacuum of 28 inches to an internal temperature of 90° C. The dehydrated mass was poured into molds and cured for 21 hours at 80° C. The cured product was of a slightly lighter shade than the cured product of the preceding example while still retaining the other desirable characteristics. The glycerine may be omitted from the above formula if a less ductile product is desired.

The ratio of the reactants to each other may be considerably varied but, in general, it is desirable to use at least one mol of an aldehyde for each mol of mixed (total) phenolic body and nitrated urea. Ordinarily not exceeding substantially ¼ mol of nitrated urea is used for each mol of phenolic body. Thus, in producing compositions comprising my new condensation products in heat-curable or heat-cured state, I may cause to react ingredients comprising the following components in the stated molar ratios: (1) one mol of a phenol, (2) at least one mol of an aldehyde, specifically an aliphatic aldehyde as, for instance, formaldehyde and (3) not exceeding substantially one-fourth mol of nitrourea or a salt thereof or a mixture of nitrourea and a salt thereof.

For molding applications the ratio of the aldehydic component to the total amount of phenolic body and nitrated urea may be considerably varied, but generally will be within the range of 1 to 3 mols of aldehyde for each mol of total nitrated urea and phenolic body. The use of higher amounts of aldehyde is not precluded, but no particular advantages appear to accrue therefrom. Approximately 1.1 to 2.5 mols aldehyde per mol of the component to be reacted therewith usually gives very satisfactory results, particularly from the viewpoint of optimum yields of condensation product per unit cost.

The fundamental resins of this invention may be varied widely by introducing other modifying bodies before, during or after effecting condensation between the primary components. Thus, as modifying agents I may use, for example, monohydric alcohols such as ethyl, propyl, butyl, amyl, etc.; polyhydric alcohols such as ethylene glycol, diethylene glycol, glycerol, pentaerythritol, trimethylol nitro methane, etc.; monoamides such as formamide, acetamide, stearamide, acrylic acid amides (acryloamides), benzamide, toluene sulfonamide, etc.; polyamides such as adipic diamide, phthalamide and the like; amines such as ethylene diamine, aniline, phenylene diamine, amino phenols, etc.

The modifying bodies also may take the form of high molecular weight bodies with or without resinous characteristics, for example partially hydrolyzed wood products, lignin, proteins, protein-aldehyde condensation products, furfural condensation products, urea-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc.; polyvinyl compounds such as polyvinyl alcohol, polyvinyl esters such as the acetate, polyvinyl acetals such as polyvinyl formal, synthetic linear condensation products such as the super-polyamides, etc.

Other modifying agents of a plasticizing or softening nature also may be incorporated into the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Dyes, pigments, etc., may be added to alter the visual appearance of the finished product. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, usually between 100° and 175° C., and at suitable pressures. The molding pressures generally range between about 1000 and about 4000 pounds per square inch.

The modified or unmodified products of this invention may be used, for instance, in making buttons, clock cases, radio cabinets, decorative novelties and various other cast and molded articles of manufacture. They also may be used in making laminated fibrous sheet materials wherein superposed layers of cloth, paper, etc., are firmly bonded together with the resin, as impregnants for electrical coils and other electrical devices, as sizings for wood, silk, cotton, wool, synthetic organic fibers, etc., in continuous filament, thread, fabric or other form, as modifying agents of other resinous bodies, and for many other purposes.

What I claim as new and desire to secure by Letters Patent of the United States is:

1. A composition of matter comprising the reaction product of ingredients comprising the following components in the stated molar ratios: (1) one mol of a phenol, (2) at least one mol of an aldehyde and (3) not exceeding substantially one-fourth mol of nitrourea.

2. A composition as in claim 1 wherein the phenolic component is phenol.

3. A composition of matter comprising the reaction product of ingredients comprising the following components in the stated molar ratios: (1) one mol of a phenol, (2) at least one mol of an aliphatic aldehyde and (3) not exceeding substantially one-fourth mol of nitrourea.

4. A composition of matter comprising an alcohol-modified condensation product of the following components in the stated molar ratios: (1) one mol of a phenol, (2) at least one mol of an aliphatic aldehyde and (3) not exceeding substantially one-fourth mol of nitrourea.

5. A composition of matter comprising the product of reaction of the following components in the stated molar ratios: (1) one mol of a phenol, (2) at least one mol of an aliphatic aldehyde and (3) not exceeding substantially one-fourth mol of nitrourea, said reaction being carried out in the presence of a substance having basic properties.

6. A heat-curable resinous composition comprising a potentially hardening condensation product of ingredients comprising the following components: (1) a phenol, (2) formaldehyde and (3) not exceeding substantially one-fourth mol of nitrourea for each mol of the phenol component of (1), the formaldehyde of (2) being present in an amount corresponding to from one to three mols of the same for each mol of the sum of the phenol component of (1) plus the nitrourea of (3).

7. A product comprising the cured resinous composition of claim 6.

8. A composition of matter comprising a condensation product of ingredients comprising the following components in the stated molar ratios: (1) one mol of a phenol, (2) at least one mol of an aliphatic aldehyde and (3) not exceeding substantially one-fourth mol of a salt of nitrourea.

9. A composition of matter comprising a condensation product of ingredients comprising the following components in the stated molar ratios: (1) one mol of a phenol, (2) at least one mol of formaldehyde and (3) not exceeding substantially one-fourth mol of a mixture of nitrourea and a salt of nitrourea.

10. A composition comprising a resinous condensation product of ingredients comprising the following components in the stated molar ratios: (1) one mol of phenol, (2) at least one mol of formaldehyde and (3) not exceeding substantially one-fourth mol of a mixture of nitrourea and a salt of nitrourea.

11. A composition comprising a resinous condensation product of ingredients comprising the following components: (1) phenol, (2) formaldehyde and (3) for each mol of the phenol of (1) not exceeding substantially one-fourth mol of nitrourea and a salt of nitrourea in an adjusted ratio to each other thereby to obtain a condensation product of desired curing rate, the formaldehyde of (2) being present in an amount corresponding to from one to three mols of the same for each mol of the sum of the phenol of (1) plus the nitrourea and the salt of the nitrourea of (3).

12. The method of producing resinous compositions which comprises reacting to resin formation 1 mol of a phenol, at least 1 mol of an aliphatic aldehyde and not exceeding substantially ¼ mol of nitrourea.

13. The method which comprises effecting partial reaction, under alkaline conditions, between ingredients comprising essentially a phenol and formaldehyde in the ratio of one mol of the former to at least one mol of the latter, adding to the resulting partial condensation product nitrourea in a small molar amount not exceeding substantially one-fourth mol for each mol of the phenol component of the said phenol-formaldehyde partial condensation product, and causing the said nitrourea to intercondense with the said partial condensation product.

GAETANO F. D'ALELIO.